United States Patent [19]

Stenert

[11] 4,015,882
[45] Apr. 5, 1977

[54] ANTI-FRICTION BEARING
[75] Inventor: Alois Stenert, Lippstadt, Germany
[73] Assignee: Hoesch Werke Aktiengesellschaft, Dortmund, Germany
[22] Filed: Apr. 11, 1975
[21] Appl. No.: 567,189
[30] Foreign Application Priority Data
Apr. 13, 1974 Germany ............................ 2418056
[52] U.S. Cl. .................................. 308/1 A; 308/35; 340/269
[51] Int. Cl.² ...................... F16C 9/00; G08B 21/00
[58] Field of Search ................ 308/1, 173, 1 A, 35; 340/269; 73/67

[56] References Cited
UNITED STATES PATENTS

| | | | |
|---|---|---|---|
| 3,011,566 | 12/1961 | Graham | 308/1 A |
| 3,508,241 | 4/1970 | Potter | 308/35 |
| 3,560,062 | 2/1971 | Kun et al. | 308/35 |
| 3,603,654 | 9/1971 | Bird | 308/35 |
| 3,797,451 | 3/1974 | Tiraspolsky et al. | 308/1 A |

FOREIGN PATENTS OR APPLICATIONS 516,658  9/1955  Canada .............................. 308/1 A Primary Examiner—Joseph F. Peters, Jr.
Assistant Examiner—Richard A. Bertsch
Attorney, Agent, or Firm—Walter Becker

[57] ABSTRACT

An anti-friction bearing, especially for absorbing large axial, radial, and moment loads, which comprises an inner race ring and an outer race ring with the raceways for receiving therebetween the anti-friction bodies such as balls, rollers, etc. One of the race rings is detachably connected with an auxillary race ring which represents an emergency raceway and corresponds to a respective raceway of the respective adjacent race ring. This auxiliary race ring is put into operation when a signalling device has indicated a certain wear of the bearing over its original condition of operation.

8 Claims, 3 Drawing Figures

ANTI-FRICTION BEARING

The present invention relates to a large anti-friction bearing for absorbng axial, radial and moment loads, which comprises an inner and an outer ring with the raceways for receiving therebetween the anti-friction bodies.

With large anti-friction bearings which include anti-friction bearings having a diameter exceeding one meter, primarily anti-friction bearings are involved which are used for large machinery, especially excavating machinery employed in connection with open-pit mining.

Ball bearings and roller bearings for use in large implements of the type mentioned above are known which have one or more raceways. The number of the raceways is determined by the various directions in which the forces act which are to be absorbed by the anti-friction bearing and also determined by the magnitude of the occurring loads. With this type of bearings, after a longer period of operation, the raceways wear to such an extent that the bearing cannot be used any longer. This wear which results in the destruction of the bearing begins with the formation of pitted areas and depressions which increase continuously and bring about the breaking off of pieces the size of peas and beans, and finally of major pieces which result in a sudden blocking of the bearing so that the entire machinery stops. Experience has shown that the ocurring wearing of the bearing is as a rule not ascertained prior to the sudden stopping of the entire machinery.

Inasmuch as these large bearings are produced individually, the delivery time amounts to several months. In addition thereto, the places where the replacement bearing is needed can frequently be reached only by sea and/or land transport requiring several weeks. The financial loss due to the standstill of the machinery over several months is so high that the owner or user of the machinery frequently orders the shipment of the replacement bearing by air even though it will cost a multiple of the price of the replacement bearing itself.

It is, therefore, an object of the present invention to provide a large anti-friction bearing of the type involved which will indicate the wear of the bearing as soon as the wear has reached a certain extent prior to the occurrence of the blocking of the bearing.

It is another object of this invention to provide a large anti-friction bearing as set forth in the preceding paragraph which will make it possible to maintain said bearing operable for an additional time until the exchange bearing arrives.

These and other objects ad advantages of the invention will appear more clearly from the following specification in connection with the accompanying drawings, in which:

FIG. 3 illustrates a section similar to that of the foregoing views and having auxillary ring means an on inner race ring.

The large anti-friction bearing according to the present invention is characterized primarily in that one of said race rings has detachably connected thereto an auxiliary or emergency race ring with an auxiliary or emergency raceway cooperating with a corresponding emergency raceway provided in the other ring While anit-friction bearing means are interposed between said two emergency race rings. Between said inner and outer race rings there is provided a signalling device which in response to the wear between the race rings exceeding a predetermined admissible value gives off a warning signal. The replacement bearing can under these circumstances be ordered early enough while the bearing by means of an auxiliary or emergency race ring and anti-frictin bearing can continue to operate until the replacement ring has arrived. In this way, the expensive shut-down periods of implements employing large anti-friction bearings of the type involved will be eliminated while the time of use of the bearing is increased.

Figure 1:
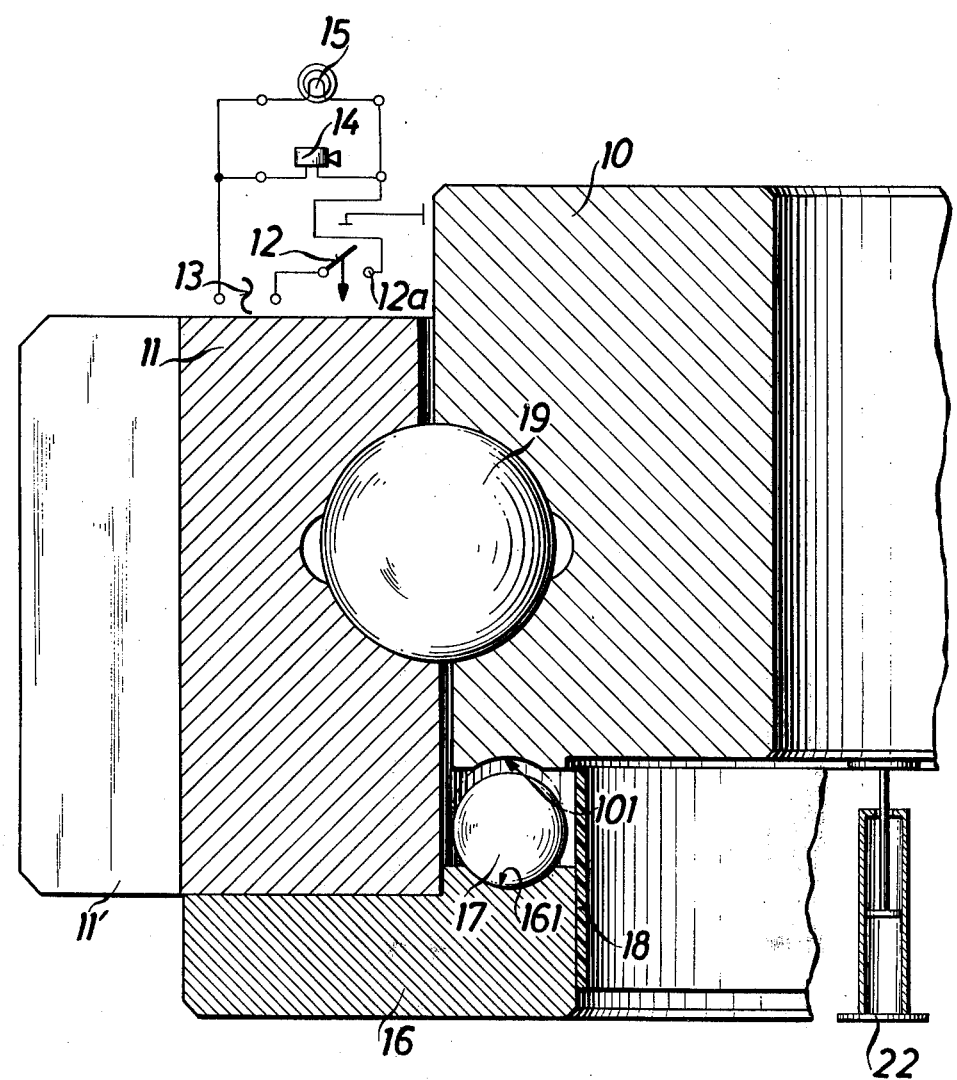
FIG. 1 illustrates in section a large anti-friction bearing according to the invention with undivided inner and outer race rings and corresponding raceways.
Figure 2:
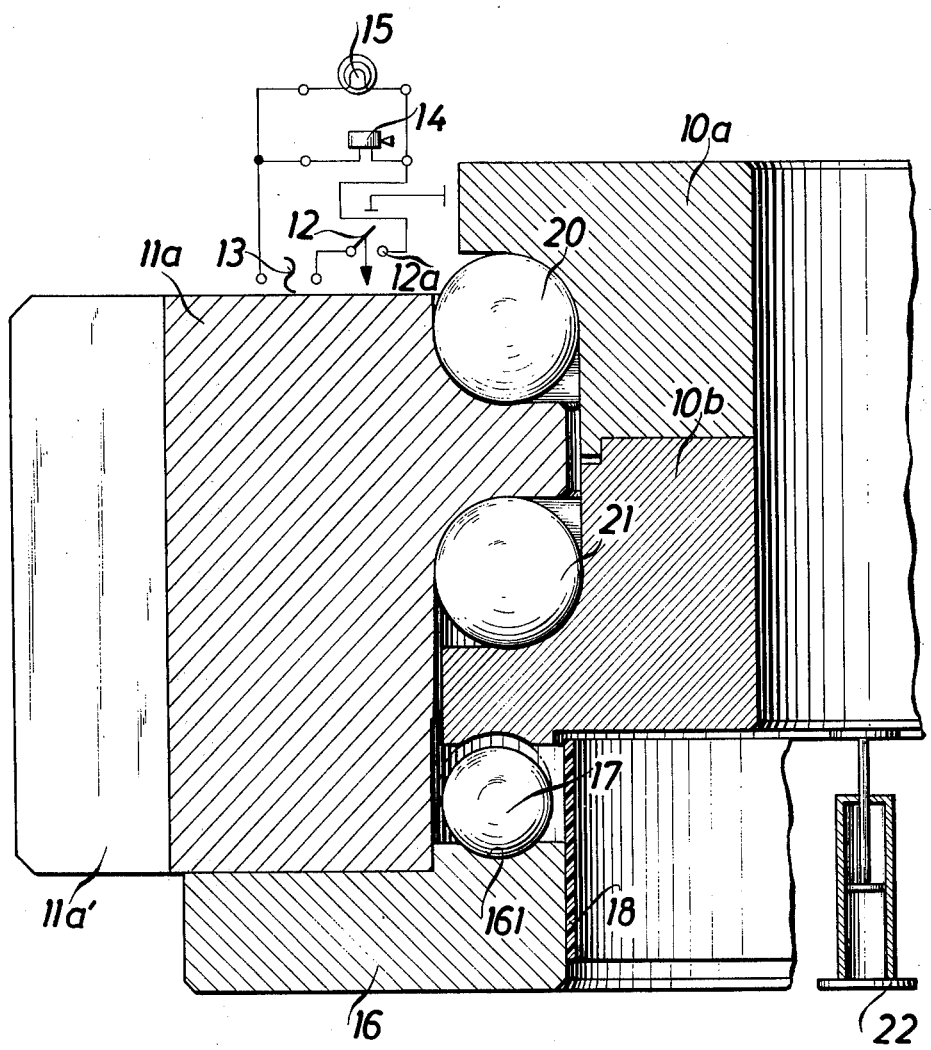
FIG. 2 illustrates a section through a modified large anti-friction bearing according to the invention with a divided or two-sectional inner ring and an undivided race ring and an undivided outer race ring with corresponding raceways.

Referring now to the drawings in detail, FIGS. 1 and 2 respectively show two different embodiments of an anti-friction bearing according to the invention. A non-illustrated heavy machine, e.g. an excavating machine, a dredge or another earth working implement having a fixed and a rotatable part, for instance an upper and a lower carriage, has a large anti-friction bearing interposed therebetween for conveying loads occurring during the employment of the respective heavy machine. In both embodiments of the invention as shown, the outer race ring 11,11a is drivingly connected by means of its teeth 11', 11a' with a drive (not shown). However, with large anti-friction bearings of the type involved in the present case, it is also possible that instead of the outer race ring, the inner race ring 10 is drivingly connected to a drive so that the inner space ring can be rotated.

The arrangement according to the invention also includes an alarm system comprising a sound emitting device 14, a light emitting device 15 which may be a lamp, preferably arranged in paralel with said device 14, a switch 12, and a source of current, e.g. an alternating current network. The alarm system, and more specifically switch 12, is so adjusted that it responds only after a predetermined admissible wear has been exceeded. When this happens, switch blade 12 engages terminal 12a and closes the circuit so that the device 15 lights up and the device 14 sounds off.

Connected to the outer race ring 11 is detachably connected an auxiliary race ring 16 with an auxiliary raceway 161 for auxiliary anti-friction bodies 17. The auxiliary raceway 161 corresponds to the auxiliary raceway 101 provided on inner race ring 10 and located adjacent anti-friction bodies 161. The auxiliary race ring 16 is by means for a sealing band 18 closed relative to its free inner space.

The occurring loads are with the embodiment of FIG. 1 absorbed and conveyed by a row of anti-friction bearings 19. When the alarm system responds, the upper carriage of said large machine, which upper carriage is operatively connected to the inner race ring 10, is lifted by hydraulically operable hoisting means 22. The reserve anti-friction bodies 17 together with the pertaining spacers or cages (not shown) are arranged between the auxiliary ring 16 and the inner race ring 10. After lowering the inner ring 10, the reserve anti-friction bodies 17 and the inner ring 10 will then act as a new anti-friction bearing. Referring now to the embodiment of FIG. 2, this embodiment differs from that of FIG. 1 primarily in that the outer ring 11a is designed as a so-called nose ring and the inner race ring is a two-sectional ring comprising the two sections 10a and 10b so that the bearing has two rows of anti-friction bodies 20, 21. The operation concerning the wear of the raceways for the anti-friction bodies 20 corresponds to that described in connection with FIG. 1.

The raceways with the anti-friction bodies 21 for absorbing moment loads remain furthermore ready for operation. With excavating machines, a wear of the anti-friction bodies 21 and the passageways therefor does not occur for all practical purposes. This is due to the particular way in which the load is effective.

FIG. 3 shows structure similar to that of the foregoing views but with auxiliary ring means on an inner race ring and having similar re-reference numerals with primes added thereto.

It is, of course, to be understood that the present invention is, by no means, limited to the specific showing in the drawings but also comprises any modifications within the scope of the appended claims. Thus, while the hoisting means 22 may be controlled manually by the operator, it is, of course, also possible to control the same electrically and to hook up the electrical control system therefor with the signalling system above referred to.

What I claim is:

1. An anti-friction bearing which includes inner and outer rings with complementary raceways and anti-friction elements in said raceways between said rings to support a load on said bearing, opposed, complementary auxiliary raceways unitary with said rings for receiving anti-friction elements therebetween, detector means to indicate excessive relative translation movement of said inner and outer rings under load, comprising a detector element carried by one ring and cooperating with means fixed on the other ring upon excessive relative translation movement of said rings under load, and signalling means actuated by said detector means upon such excessive movement, said auxiliary racewwys receiving anti-friction elements for cooperation with said anti-friction bearing to support said load.

2. A large anti-friction in bearing in combination according to claim 1, which includes a sealing band connected to said emergency race ring for sealing the latter toward the outside.

3. A large anti-friction bearing in combination according to claim 2, which includes signalling means and switch means interposed between said inner and outer race rings for indicating excessive wear between said race rings.

4. A large anti-friction in bearing in combination according to claim 3, in which one of said race rings is a multi-sectional race ring with two rows of anti-friction bodies.

5. A bearing as claimed in claim 1, in which one of said auxiliary raceways is formed in a member detachably fixed on one of said rings.

6. A bearing as claimed in claim 1, in which said detector means is adjustable to indicate the amount of wear.

7. A large anti-friction bearing for absorbing axial, radial and moment loads, which includes: an inner race ring with raceway means, an outer race ring with raceway means for cooperation with the raceway means for said inner race ring, anti-friction body means interposed between said raceway means of said inner and outer race rings, an emergency race ring detachably connected to one of said race rings and provided with an emergency raceway and the othe end of said race rings being provided with a corresponding emergency raceway, anti-friction means interposed between said two emergency raceways and being spaced from one of said two emergency raceways until the rear of siad inner and outer race rings has exceeded a predetermined permissible value, and hoisting means for lifting one of said race rings relative to the other one.

8. The method of operating a bearing to prevent complete failure of the bearing, said bearing having two main raceways spaced by anti-friction elements which limit relative translation movement of said raceways under a load applied to said bearing, said method comprising providing auxiliary complementary raceways on said main raceways, detecting excessive relative translation movement of said main raceways resulting from wear of said bearing and signalling such movement, separating said raceways when said bearing becomes worn as indicated by said signalling, inserting anti-friction elements between said auxiliary raceways, and reassembling said main and auxiliary raceways and elements, so that the auxiliary raceways and elements cooperate with said main raceways and elements to support the load.

* * * * *